United States Patent [19]

Fitzgibbons et al.

[11] Patent Number: 5,626,923
[45] Date of Patent: May 6, 1997

[54] METHOD OF APPLYING CERAMIC COATING COMPOSITIONS TO CERAMIC OR METALLIC SUBSTRATE

[75] Inventors: Jerry M. Fitzgibbons, Cahokia, Ill.; James E. French, Ballwin, Mo.

[73] Assignee: McDonnell Douglas Corporation, St. Louis, Mo.

[21] Appl. No.: 531,228

[22] Filed: Sep. 19, 1995

[51] Int. Cl.$^6$ .................. H05H 1/24; B05D 3/02
[52] U.S. Cl. .......... 427/535; 427/569; 427/299; 427/376.2; 427/359
[58] Field of Search ............... 427/376.2, 359

[56] References Cited

U.S. PATENT DOCUMENTS

| | | | |
|---|---|---|---|
| 2,771,969 | 11/1956 | Brownlow | 428/552 |
| 3,074,143 | 1/1963 | Smith | 264/62 |
| 3,133,829 | 5/1964 | Cupery et al. | 427/379 |
| 3,189,504 | 6/1965 | Whittle et al. | 156/234 |
| 3,695,960 | 10/1972 | Richter | 156/89 |
| 4,427,721 | 1/1984 | Cairns et al. | 427/376.2 |
| 4,564,537 | 1/1986 | Austin et al. | 427/376.4 |
| 5,034,358 | 7/1991 | MacMillan | 501/106 |
| 5,089,064 | 2/1992 | Reghi | 427/430.1 |
| 5,098,747 | 3/1992 | Kalchauer et al. | 427/376.2 |
| 5,190,610 | 3/1993 | Ek | 156/89 |
| 5,266,358 | 11/1993 | Uemura et al. | 427/376.2 |
| 5,316,602 | 5/1994 | Kogame et al. | 156/64 |
| 5,328,975 | 7/1994 | Hanson et al. | 427/375 |
| 5,431,961 | 7/1995 | Kirkwood et al. | 427/376.2 |

FOREIGN PATENT DOCUMENTS

| | | |
|---|---|---|
| 675087 | 3/1995 | European Pat. Off. . |
| 4338360 | 5/1995 | Germany . |
| 4417405 | 11/1995 | Germany . |

*Primary Examiner*—Mark L. Bell
*Assistant Examiner*—Louis M. Troilo
*Attorney, Agent, or Firm*—Bryan Cave LLP

[57] ABSTRACT

A method for providing a ceramic coating on a ceramic or metallic substrate and the ceramic coating composition useful therein. The coating composition comprises a putty-like material comprising a colloidal silica, a base for gelling the silica, a filler, and no more than 50 wt. % of a volatile solvent or solvents. The putty-like material is rolled onto the desired substrate and cured to form a protective ceramic coating of any desired thickness. The cured coating may be fired, if desired.

6 Claims, No Drawings

METHOD OF APPLYING CERAMIC COATING COMPOSITIONS TO CERAMIC OR METALLIC SUBSTRATE

BACKGROUND OF THE INVENTION

1. Field of the Invention

The present invention relates to ceramic coatings and, more particularly, to putty-like ceramic coating compositions, and a method of applying such compositions to ceramic or metallic substrates.

2. Description of the Prior Art

Protective ceramic coatings are useful in various applications. For example, such coatings may be used as thermal barriers applied to ceramic or metallic substrates subjected to high temperatures, as abrasion resistant coatings, and as conductive coatings applied to electrical resistance elements.

Traditionally, ceramic coatings are applied to ceramic or metallic substrates using one of two different processes. In the first process, a slurry of a ceramic and/or metallic filler and a cementitious or sinterable ceramic or metal binder is sprayed, in a suitable aqueous or organic solvent, to a desired thickness on the substrate. The substrate is then fired to remove the solvent and any organic binders, and to form or sinter the ceramic binder. In the second process, the so-called dry spray method, the ceramic and/or metallic ingredients are sprayed without solvent at a high velocity onto the substrate through a flame or plasma which causes the component materials to melt prior to impact with the substrate.

These conventional methods suffer from several shortcomings. For example, the traditional wet spray method is quite labor intensive and in situations where direct measurement is impossible, thickness control is difficult. In order to provide ceramic coatings of substantial thickness, several layers of coating, each approximately two to three mils thick, must be applied to the part to be coated. Prior to applying each subsequent coat, the part must be dried, i.e., the solvent must be evaporated, to prevent dripping and sagging of the coating and to prevent the solvent from becoming entrapped as subsequent layers are applied, which may result in bubbling when the coating is fired. After the coating is built up to a sufficient thickness, it is fired to a temperature sufficient to react the cementitious binder or to sinter the ceramic binder.

In the case of cementitious binders and especially in the case of sinterable binders, supplemental organic thickeners are needed to prevent settling, to control rheology, and to impart green strength to the coating so as to minimize shrinkage or cracking during drying. The use of these additives may necessitate slow curing of the coated part to remove organic decomposition products without disrupting the coating structure.

In addition, ceramic coatings applied using the traditional wet spray method are often applied from aqueous solutions, requiring increased drying times and imparting increased porosities to the resulting ceramic coatings after drying. Moreover, because the ceramic coatings are applied as aqueous solutions, it is extremely difficult to make repairs of damaged components. This is especially true when the part requiring repair is large and must be repaired in the field, e.g., an aircraft wing, or when the damaged portion of the coated part is difficult to access.

Using the conventional dry spray method, specialized equipment is required to apply the coatings. Although this equipment is usually available where the initial coating is applied, it may not be available at locations where coating repairs must be made. Also, the extreme heat and velocity used in this method can damage certain fillers incorporated in the ceramic formulations by oxidizing or distorting the fillers on the substrate surface as the composition is applied. Such damage can, in certain instances, impair the performance of the coatings.

Thus, various problems and disadvantages exist with prior art methods for applying ceramic coatings. These problems and disadvantages are overcome by the present invention.

SUMMARY OF THE INVENTION

The present invention relates to a coating composition and method for producing a ceramic coating, which composition is applied to a substrate as a putty-like coating, rather than by wet or dry spraying of a slurry or dry coating. Use of the ceramic coating composition and method of the invention facilitates the direct application of thick coatings without the use of organic additives or large residual proportions of volatiles which might produce bubbling of the coating. Since the ceramic formulation is applied as a putty-like coating, the invention may be used to make field repairs, since the putty-like coating material can be used to repair coatings on vertical and inverted surfaces of installed parts, and the pressure and temperature requirements for curing the coating can be met with vacuum bag and heating blanket procedures.

Use of the invention is suitable for the initial application of a ceramic coating to substrates. Application of the coating as a putty also decreases the time required to dry and cure the final coating and minimizes the exposure of fillers to oxidation and distortion during application.

The method of the invention may also be used to produce layers within ceramic composites to impart specific properties, such as electrical or thermal conductivity. In addition, the low volatiles content of the coating formulations facilitates their use in adhesive applications such as metal-metal bonding, ceramic-metal bonding, and ceramic-ceramic bonding.

The coating composition of the present invention comprises:

(1) a colloidal silica dispersed in a polar organic solvent;

(2) at least one base in an amount of about 0.1 to 1.0 mole per mole of the colloidal silica, for gelling the silica; and (3) at least one filler for forming refractory phases with the silicate(s) produced upon firing the ceramic coating formed with the composition, and for imparting desired mechanical, thermal and electrical properties to the ceramic coating; and the composition incorporates no more than about 50 wt. % of volatile solvents, so as to provide a putty-like coating composition.

The use of a colloidal silica dispersed in a polar organic solvent is an important element of the coating composition, since it eliminates the use of slow drying aqueous formulations and facilitates the development of unique rheology. The base (or bases) gel the silica and facilitate the formation of a corresponding silicate or silicates upon pyrolysis of the ceramic coating formed with the composition. The filler and/or fillers react(s) with the silicate(s) thus formed to produce additional refractory phases, and impart(s) desired mechanical, thermal and/or electrical properties to the ceramic coating product. Different fillers may be chosen for thermal insulating coatings, for thermal barrier protection of metal parts, for electrically conductive coatings for electromagnetic interference shielding of ceramic enclosures, for abradable coatings for high temperature seals, or for other specific applications. The filler may also be chosen with a view to matching the coefficient of thermal conductivity (CTE) of the preferred ceramic or metallic substrate for the prospective coating.

One important aspect of the coating composition of the present invention is the limitation of the content of volatile solvents in the composition to no more than about 50 wt. %, and preferably about 10–30 wt. %, of the composition, assuming average filler specific gravities of 3–5 gms/cc. By so limiting the solvent content, as by partial drying of a silica gel precursor material, the coating composition is provided in the form of a putty-like material, viz., a pasty substance having the consistency of dough or cement. Such material may be readily rolled into sheets of any desired thicknesses and directly applied to ceramic or metallic substrates, with reduced risk of bubbling of the coatings during subsequent curing and/or firing operations. The resulting coating composition may thus be utilized without the difficulties involved in the application of previously proposed ceramic coatings.

In accordance with the method of the present invention, a ceramic coating is applied to a ceramic or metallic substrate, utilizing the foregoing putty-like material, by:

(a) forming a sol of a colloidal silica dispersed in a polar organic solvent;

(b) adding a base to the sol in an amount of from about 0.1 to 1.0 mole per mole of the colloidal silica, to produce a corresponding silica gel;

(c) adding one or more fillers to the silica sol formed in step (a), or to the silica gel formed in step (b), in an amount of about 2 to 20 times the weight of the colloidal silica (assuming the filler used has a specific gravity range of 2–10 g/cc);

(d) mixing the sol or gel after addition of the filler(s) in step (c) to thoroughly disperse the filler(s) therein;

(e) at least partially drying the filler-containing silica gel to form a putty-like coating composition, said composition incorporating no more than about 50 wt. % of volatile solvents;

(f) preparing a ceramic or metallic substrate for adhesion of the coating composition thereto;

(g) applying the coating composition to the substrate; and (h) curing the coated substrate to form the ceramic coating thereon.

The coating composition is suitably applied to the ceramic or metallic substrate in step (g) by rolling the putty-like material into a sheet of controlled thickness, either prior to or during application to the substrate, and applying the "putty" to the substrate with heat and pressure.

The auxiliary steps of preparing the ceramic or metallic substrate for adhesion of the coating, curing the coating on the substrate and, if desired, firing the coating to obtain optimum strength and adhesion, may be carried out by procedures known in the art. Thus, the substrate may be prepared for the coating by degreasing, sandblasting, priming and/or plasma spraying of a suitable bonding coat; the coating may be cured, depending upon the nature of the coated part, by the application of both pressure and heat; and the coated part may thereafter be fired in conventional manner.

The ceramic coatings thereby formed comprise silicates formed by reaction of the colloidal silica with the base incorporated in the coating composition, and other refractory phases formed by reaction of the filler, e.g., a ceramic, glass, metallic or other filler, with the colloidal silica upon firing of the coating. Alternatively, if the nature or configuration of the substrate does not permit firing of the coated part, it need not be separately fired; in such instance, high temperature use of the coated part improves the mechanical properties and adhesion of the ceramic coating to the substrate.

PREFERRED EMBODIMENTS OF THE INVENTION

The colloidal silica incorporated in the coating composition of the present invention must be a fine particle size silica of less than 0.01 micron. Preferably, the silica is dispersed in a polar solvent, e.g., in an alcoholic sol such as IPA-ST, commercially available from Nissan Chemical. Alternatively, an organometallic silica, such as tetraethylorthosilicate, can be hydrolyzed with base and stoichiometric amounts of water to form a sol in situ. Another suitable alternative is to use a fine particle fumed silica and mechanically disperse the material in a solvent by, for example, ball milling. The silica is preferably incorporated in an amount of about 10–20 wt. % of the putty-like coating composition after formulation thereof.

As indicated above, the silica-containing sol is thereafter gelled by the addition of base. A wide variety of organic and inorganic bases may be used for such purpose, including organics such as tetraethylammonium hydroxide; alkali metal hydroxides such as sodium hydroxide, lithium hydroxide or potassium hydroxide; ammonium hydroxide; alkaline earth metal hydroxides such as barium hydroxide; or oxides such as barium oxide or strontium oxide. In addition to gelling the initial sol, the bases react with the silica upon firing of the final ceramic coatings to produce the corresponding alkali metal, alkaline earth metal or other silicates. Sodium hydroxide or potassium hydroxide are the preferred bases, both because of their solubility in polar solvents and because of their suitability for forming silicate binding phases upon firing of the ultimate ceramic coatings.

The base may be partially added prior to gelation to form the sol in situ, or added entirely during the subsequent gelation step. In either case, the base is added in an amount of about 0.1 to 2.0 mole, preferably about 0.5 to 1.0 mole, per mole of the colloidal silica.

Desirably, the coating formulation additionally incorporates one or more fillers to impart desired mechanical, thermal or electrical properties to the ultimate ceramic coatings to be formed. For example, fine particle size ceramic powders such as submicron alumina having particle sizes of about 0.01–1.0 microns, may be included in the coating formulation in a sufficient amount to react with the silicates on firing of the coating to form more refractory phases, thereby strengthening the coating and increasing bonding to the substrate.

Another preferred filler is glass frit, which may be used to modify the CTE of the ceramic coating. The glass frit will also sinter and/or flow into the porous coating at firing or operating temperatures and thereby improve the mechanical properties of the coating and its adhesion to the substrate. The glass frit is preferably selected based upon its thermal expansion characteristics and on the softening point of the glass. Alternatively, a glass-ceramic may be used to strengthen the coating without affecting the high-temperature strength of the coating.

For moderate temperature, low expansion substrates, e.g., ceramic composites having a CTE of about 4 ppm/°C., preferred glass fillers include borosilicate glass such as Corning 7740 or Ferro CC266. For moderate expansion substrates, e.g., titanium metal, acceptable glass fillers include silicate glasses such as Corning 8445, Corning 9013, and Ferro CC257. For higher expansion substrates, a preferred glass filler is Ferro 2717. In all cases, it is preferred to ball-mill the glass frit or glass-ceramic powder down to a particle size of less than two microns. The glass softening point may be modified by any known method, such as by the addition of various alkali metals or boria to the silica-glass compositions. Although the addition of glass frit to the coating formulation may reduce the mechanical properties of the ceramic coating above the glass softening point, the addition of the glass frit results in considerable improvement in hardness and adhesion of the coating at lower temperatures.

Other ceramic or metal fillers may be used to impart special properties to the ceramic coating for specific applications. For example, stabilized zirconias may be used as fillers for thermal barrier performance; silicon carbide, silicon nitride, or alumina may be used for abrasion-resistant coatings; oxidation stable nickel or iron-based alloys may be used for electrically or thermally conductive, or magnetic, coatings; and boron nitride may be used for high-temperature lubrication coatings.

In general, the selection of the appropriate functional filler(s) depends upon the desired attributes of the final ceramic coating and the CTE of the selected substrate. The thermal expansion properties of the fillers should match the CTE of the substrate. The fillers should be inert to the coating formulation and stable under the operating temperatures utilized in the desired application. Thus, acceptable fillers include any powders that can impart desirable properties to the ceramic coating and which are stable at the temperature and other conditions to which the coating will be exposed during use.

For low temperature curing applications, e.g., in the range of 150° C., acceptable fillers include organic polymers such, for example, as polytetrafluoroethylene (TEFLON®) or oxidation sensitive fillers such as iron powder, or carbonaceous materials such as graphite or carbon black. Potential fillers for high-temperature applications include refractory ceramics such as alumina, silicon carbide, stabilized zirconia, silicon nitride and refractory metals and alloys such as Inconel or NiCrAlY powders, platinum, silicon, intermetallic powders such as molybdenum disilicide, as well as a variety of glass and glass-ceramic powders based on silica modified with, by way of example, alumina, boria, magnesium, alkali metal/alkaline earth metals and fluoride.

The filler is desirably incorporated in the coating composition in an amount of about 2 to 20 times the weight of the colloidal silica ingredient. It will be understood that the particular proportion of filler will vary, depending upon the nature and specific gravity of the particular filler, the substrate to which the ceramic coating is to be applied, and the desired mechanical, thermal and electrical properties of the final coating.

The function of the polar organic solvent in the coating composition is to wet the filler components and to dissolve the base, thereby permitting the base to gel the silica sol. The solvent must be volatile, i.e., have a boiling point below about 200° C., preferably below 100° C. to facilitate its removal by a low temperature drying process. Preferred solvents include lower monohydric alcohols, e.g., $C_{1-3}$ alkanols such as methanol, ethanol, and isopropanol; ketones, such as acetone or methylethylketone; glycols, such as ethylene glycol; or ethers, such as tetrahydroforan or dioxane.

The amount of solvent necessary for formulation of the coating composition depends upon the solvent demand of the filler(s) of choice, which may depend, for example, on the surface area of the filler(s). The solvent should be chosen to form a slurry of low viscosity for dispersion by a conventional method such as ball milling. Preferably, the amount of solvent incorporated in the gel is about 1–5 times the combined weight of the filler base, and colloidal silica, prior to their evaporation from the coating composition.

As indicated above, the filler or fillers may be added to the coating composition, in whole or in part, prior to or subsequent to gelation of the colloidal silica sol. In either case the fillers are thoroughly dispersed throughout the formulation, e.g., by ball milling.

The substantially homogenous, filler-containing gelled formulation is thereafter dried to eliminate the bulk if not all of the volatile solvents therefrom, the dried material providing the putty-like coating composition of the invention. The drying step may be effected by conventional solvent evaporation techniques such as vacuum distillation, or by blowing an air stream over the gel formulation. The thus dried putty-like coating composition should contain no more than about 50 wt. % of the volatile solvent or solvents utilized in the prior sol and gel-formation steps.

The ceramic or metallic substrate is preferably prepared for application of the coating composition by conventional techniques. The substrate may, for example, be degreased, sand blasted and plasma sprayed with one of the NiCrAlY-type bonding coat materials available commercially. Preferably, the plasma spray used is of the type of NiCoCrAlY, such as Metco 461. If desired, prior to application, the substrate may also be primed with a sodium silicate solution or the like for improved adhesion to the ceramic coating.

The putty-like coating composition may be applied to the substrate using any appropriate method. If desired, it may be rolled into thin sheets of the desired thickness prior to application to the substrate. Alternatively, the putty can be rolled into the desired thickness during application to the desired substrate.

The coating composition can be applied directly to flat surfaces using a rolling procedure with cork dams to establish the desired thickness, or, for contoured surfaces, it may be rolled through a controlled gap between two sheets of release film to generate a sheet of predetermined thickness.

In the latter instance, the release film is removed from one side prior to gently pressing the sheet onto the part, followed by removal of the second sheet, replacement of this outer sheet with breather cloth, and bagging the part prior to subsequent curing.

If the films are stored for an appreciable amount of time, it may be necessary to dampen the surface with solvent to restore proper pliability and tackiness. The coating thickness preferably varies between about 5–100 mils, depending upon the particular application for the coating. For weight and adherence properties, the thinnest coating capable of performing a given function is preferred.

The coating is then cured in conventional manner on the substrate. Various cure cycles are acceptable for drying, setting, and adhering the coating to the substrate, including heating accompanied by autoclave or vacuum bag pressure. Preferably, a pressure of at least 5 psi is used in order to insure proper adhesion to the substrate. Alternatively, if it is possible to cure the coating in an autoclave, 50–100 psi is preferred. If a field repair is needed, full vacuum bag pressure (14.7 psi) is preferred.

The cure cycle is preferably tailored to slowly remove any residual solvent, thereby preventing bubbling of the ceramic coating. The optimum time needed for cure is dependent upon the solvent mix and the porosity of the substrate. The final temperature of the cure is preferably between 300°–600° C., but temperatures as low as 200° C. may be sufficient.

Following curing of the coating on the substrate, the coated part may be fired to increase the strength and adhesion of the coating. The coated part is preferably fired at 800°–1000° C. for a period of one to two hours, especially if a glass filler is used in the coating composition. However, if the substrate is not capable of withstanding such temperatures, or if the part is prone to warping, firing is not required, and the cured coating will have sufficient strength and adhesion for most applications. This enables the coating formulation to be used as a repair material on an installed part that cannot be fired. High temperature use of the coated part has been found to improve the mechanical properties and adhesion of the coating.

EXAMPLES

The principles and features of the present invention are illustrated in the following examples, which are intended as illustrative only.

Example 1

Coating an Inconel Sheet 112 grams of 6 wt. % of yttria ($Y_2O_3$)-stabilized zirconia powder was milled with 10 grams of alumina having a 0.3 micron mean particle size, 11.5 grams of a high expansion glass-ceramic filler (Ferro EG 2727), 44.5 grams of 30% silica in isopropanol (IPA-ST, commercially available from Nissan Chemicals), and sufficient excess isopropanol to thoroughly wet the mix. The mix was then dispersed overnight in alumina grinding media on a roller mill and then separated from the media. To the well dispersed mix, 12 grams of potassium hydroxide dissolved in methanol was added. The resulting gel was then heated to evaporate the bulk of the solvents and form a tacky, putty-like residue containing 25 wt. % methanol. The putty was rolled onto a 2"×2" debonded area of a plasma-sprayed zirconia-yttria ($ZrO_2$-$Y_2O_3$) thermal barrier-coated Inconel. Prior to applying the putty-like coating, the barrier-coated Inconel was primed with a NiCoCrYAl bonding coat.

The resulting repaired part was pressurized under a vacuum by covering the repaired area with breather cloth and a caul plate and sealing a vacuum bag over the repaired area. The part was heated by the use of a heat blanket up to a temperature of 600° F., using the vacuum to pressurize the repair throughout a 6 hour temperature ramp. After cure, the panel was subjected to repeated and rapid heatup burner rig cycles to 1000° C. without any signs of cracking or debonding of the repaired area.

Example 2

Coating a Reinforced Ceramic Composite

A 4"×4"×⅛" piece of fiber-reinforced ceramic composite was fabricated from NICALON 8 harness satin ceramic cloth (commercially available from Nippon Carbon) and BLACKGLAS polysiloxane polymer (commercially available from Allied Signal), using autoclave curing. The composite was pyrolyzed to 900° C.; repeatedly re-impregnated; and re-pyrolyzed (5 times) to achieve a density of 2.1 g/cc.

75 grams of fine (1–3 micron particle size) alpha silicon carbide powder was mixed with 24 grams of a borosilicate glass frit (Ferro CC 266) by ball milling with alumina grinding media in acetone. Potassium hydroxide pellets (24 grams) were ground and dissolved in acetone, then added to 89 grams of a 30% dispersion of colloidal silica in isopropanol. The ball milled slurry of the filler was then added to the silica sol and the mixture vigorously stirred.

The resulting gel was evaporated to form a tacky, putty-like paste containing 30 wt. % acetone. The paste was rolled into a thin sheet (50 mils), then placed on the surface of the 4" by 4" ceramic laminate, after preparing the surface by painting with the colloidal silica, and drying. The laminate was surrounded with a cork dam of specific thickness and the assembly vacuum bagged as described in Example 1, using a caul plate wrapped with release cloth to apply pressure. The ceramic coating was cured by autoclaving at 50 psi pressure, with full vacuum on the bag, with the temperature increased from 30° C. to 150° C. at a rate of 1° C./minute, maintained for 5 hours at 150° C., and then decreased to allow the part to cool over a two hour period. The bonded coating was then fired to 800° C. in a muffle furnace using a heating rate of 10° C./minute.

The resulting 20 mil ceramic coating on the ceramic composite was subjected to several rapid heat-up-cool-down cycles in the muffle furnace to 800° C. without any signs of debonding.

Example 3

Coating a Titanium Sheet 150 grams of an Inconel alloy powder was blended with 24 grams of a moderate expansion glass frit (Ferro CE 257) and 20 grams of submicron alumina powder (0.3 microns), by ball milling with alumina grinding media in isopropanol. Potassium hydroxide pellets (24 grams) were ground and dissolved in 40 ml. of methanol. The alloy-ceramic slurry was added to 89 grams of a 30% dispersion of colloidal silica in isopropanol. After thorough mixing, the methanolic solution of potassium hydroxide was added to gel the dispersion.

The solvent was then evaporated from the mixture with an air stream until a thick paste (containing 20 wt. % of isopropanol and methanol) separated from the remaining excess solvent. The excess solvent was decanted and the paste rolled flat into a tacky sheet.

A portion of the sheet, approximately 80 mils thick, was placed on a 4"×4" piece of titanium on which a 5 mil bond coat of Metco 461 was first plasma sprayed to improve adhesion. The material was rolled into the plate surface and cured in an oven under a caul plate and a 50 pound weight, using a heating rate of 1° C./minute up to 300° C., followed by a two hour hold cycle at a temperature of 300° C.

The resulting 60 mil coating was repeatedly thermally cycled between room temperature and 650° C. in a burner rig, without noting any spallation.

As shown by the foregoing examples, the ceramic coatings produced in accordance with the method of the present invention exhibit excellent ceramic to substrate bonding without any noticeable cracking or spallation of the coating.

Although the method and compositions hereof have been described in detail with reference to certain preferred versions thereof, it will be understood that variations may be made therein without departing from the spirit and scope of the present invention.

What is claimed is:

1. A method for applying a ceramic coating to a ceramic or metallic substrate, comprising:

(a) forming a sol of a colloidal silica dispersed in a polar organic solvent;

(b) adding a base to the sol in an amount of from 0.1 to 1.0 mole per mole of the colloidal silica, to produce a corresponding silica gel;

(c) adding at least one filler to the silica sol formed in step (a), or to the silica gel formed in step (b), in an amount of about 2 to 20 times the weight of the colloidal silica, wherein the filler is a ceramic, glass, metallic, polymeric or carbonaceous filler material, or a mixture thereof;

(d) mixing the sol or gel after addition of the filler in step (c) to thoroughly disperse the filler therein;

(e) at least partially drying the filler-containing silica gel to form a coating composition in the form of a paste, said composition incorporating no more than 50 wt. % of volatile solvents;

(f) applying the coating composition to a ceramic or metallic substrate; and (g) curing the coated substrate to form the ceramic coating thereon.

2. The method of claim 1, wherein the application step (f) comprises rolling the coating composition into a sheet having a thickness between 5 and 100 mils prior to application to the substrate.

3. The method of claim 1, wherein the application step (f) comprises rolling the coating composition into a coating having a thickness between 5 and 100 mils during application to the substrate.

4. The method of claim 1, wherein the application step (f) comprises rolling the coating composition through a gap between two sheets of release film to generate a coating having a thickness between 5 and 100 mils.

5. The method of claim 1, further comprising the step of firing the ceramic coating at between 800° C. and 1000° C. for a period of between one and two hours.

6. The method of claim 1, further comprising the step of prepararing the ceramic or metallic substrate for adhesion of the coating composition thereto by degreasing, sandblasting or priming the substrate, or by plasma spraying of a bonding coat thereon.

\* \* \* \* \*